(12) United States Patent
Favresse et al.

(10) Patent No.: US 11,261,298 B2
(45) Date of Patent: Mar. 1, 2022

(54) TAILORED SIOC-BASED POLYETHERSILOXANES

(71) Applicant: Evonik Operations GmbH, Essen (DE)

(72) Inventors: Philippe Favresse, Ratingen (DE); Michael Fiedel, Essen (DE); André Brötzmann, Essen (DE); Wilfried Knott, Essen (DE); Horst Dudzik, Essen (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 15/929,842

(22) Filed: May 26, 2020

(65) Prior Publication Data

US 2020/0377663 A1   Dec. 3, 2020

(30) Foreign Application Priority Data

May 28, 2019 (EP) .................................... 19176888

(51) Int. Cl.
*C08L 83/06* (2006.01)
*C08G 77/18* (2006.01)

(52) U.S. Cl.
CPC ............. *C08G 77/18* (2013.01); *C08L 83/06* (2013.01); *C08L 2205/025* (2013.01); *C08L 2205/03* (2013.01)

(58) Field of Classification Search
CPC .......... C08L 83/06; C08G 77/14; C08G 77/46
See application file for complete search history.

(56) References Cited

U.S. PATENT DOCUMENTS

| | | | |
|---|---|---|---|
| 4,066,680 A | 1/1978 | Lewis et al. | |
| 5,032,662 A * | 7/1991 | Berger .................. | C09D 5/024 528/25 |
| 5,371,161 A | 12/1994 | Knott | |
| 5,455,367 A | 10/1995 | Klein et al. | |
| 5,475,127 A | 12/1995 | Klein et al. | |
| 5,856,548 A | 1/1999 | Dröse et al. | |
| 5,981,812 A | 11/1999 | Eufinger et al. | |
| 6,291,622 B1 | 9/2001 | Dröse et al. | |
| 6,307,082 B1 | 10/2001 | Klein et al. | |
| 6,858,663 B2 | 2/2005 | Knott et al. | |
| 7,018,458 B2 | 3/2006 | Knott et al. | |
| 7,125,585 B2 | 10/2006 | Dudzik et al. | |
| 7,157,541 B2 | 1/2007 | Knott et al. | |
| 7,196,153 B2 | 3/2007 | Burkhart et al. | |
| 7,598,334 B2 | 10/2009 | Ferenz et al. | |
| 7,612,159 B2 | 11/2009 | Burkhart et al. | |
| 7,619,035 B2 | 11/2009 | Henning et al. | |
| 7,645,848 B2 | 1/2010 | Knott et al. | |
| 7,754,778 B2 | 7/2010 | Knott et al. | |
| 7,825,205 B2 | 11/2010 | Knott et al. | |
| 7,825,206 B2 | 11/2010 | Neumann et al. | |
| 7,825,209 B2 | 11/2010 | Knott et al. | |
| 7,838,603 B2 | 11/2010 | Schwab et al. | |
| 8,138,294 B2 | 3/2012 | Henning et al. | |
| 8,247,525 B2 | 8/2012 | Schubert et al. | |
| 8,268,939 B2 | 9/2012 | Ebbrecht et al. | |
| 8,283,422 B2 | 10/2012 | Schubert et al. | |
| 8,309,664 B2 | 11/2012 | Knott et al. | |
| 8,309,673 B2 | 11/2012 | Schubert et al. | |
| 8,324,325 B2 | 12/2012 | Knott et al. | |
| 8,334,355 B2 | 12/2012 | Henning et al. | |
| 8,349,907 B2 | 1/2013 | Henning et al. | |
| 8,450,514 B2 | 5/2013 | Schubert et al. | |
| 8,455,603 B2 | 6/2013 | Ferenz et al. | |
| 8,557,944 B2 | 10/2013 | Henning et al. | |
| 8,598,295 B2 | 12/2013 | Henning et al. | |
| 8,609,798 B2 | 12/2013 | Knott et al. | |
| 8,623,984 B2 | 1/2014 | Henning et al. | |
| 8,722,834 B2 | 5/2014 | Knott et al. | |
| 8,722,836 B2 | 5/2014 | Knott et al. | |
| 8,729,207 B2 | 5/2014 | Hartung et al. | |
| 8,772,423 B2 | 7/2014 | de Gans et al. | |
| 8,779,079 B2 | 7/2014 | Henning et al. | |
| 8,802,744 B2 | 8/2014 | Knott et al. | |
| 8,921,437 B2 | 12/2014 | Knott et al. | |

(Continued)

FOREIGN PATENT DOCUMENTS

DE   41 16 987    7/1992
EP   0 514 737    2/1996

(Continued)

OTHER PUBLICATIONS

European Search Report dated Nov. 8, 2019 in European Application No. 19176888.6.
U.S. Appl. No. 10/083,763, filed Feb. 25, 2002, Burkhart et al.
U.S. Appl. No. 11/633,378, filed Dec. 4, 2006, 2007/0128143, Gruning et al.
U.S. Appl. No. 12/277,852, filed Nov. 25, 2008, 2009/0137752, Knott et al.
U.S. Appl. No. 12/414,805, filed Mar. 31, 2009, 2010/0081781, Schubert et al.
U.S. Appl. No. 13/031,324, filed Feb. 21, 2011, 2011/0230619, Kuppert et al.
U.S. Appl. No. 13/058,372, filed Jul. 16, 2009, 2011/0144269, Kuppert et al.

(Continued)

*Primary Examiner* — Kuo Liang Peng
(74) *Attorney, Agent, or Firm* — Grüneberg and Myers PLLC

(57) ABSTRACT

SiOC-based polyethersiloxanes are prepared based on linear α,ω-hydroxy group-bearing siloxanes. In a first step, α,ω-acetoxy group-bearing linear polysiloxanes are prepared. In a second step, the α,ω-acetoxy group-bearing linear polysiloxanes are converted into the desired organosiloxane units, preferably shorter organosiloxane units, wherein the thus converted organosiloxane units have α,ω-acetoxy groups. In a third step, the α,ω-acetoxy group-bearing linear polysiloxanes from step 2 react with polyetherols to give SiOC-based polyethersiloxanes.

21 Claims, No Drawings

(56) References Cited

U.S. PATENT DOCUMENTS

| | | |
|---|---|---|
| 8,946,369 B2 | 2/2015 | Henning et al. |
| 8,957,009 B2 | 2/2015 | Schubert et al. |
| 8,974,627 B2 | 3/2015 | Schubert et al. |
| 8,993,706 B2 | 3/2015 | Schubert et al. |
| 9,035,011 B2 | 5/2015 | Ferenz et al. |
| 9,068,044 B2 | 6/2015 | Schubert et al. |
| 9,115,335 B2 | 8/2015 | Trosin et al. |
| 9,315,614 B2 | 4/2016 | Schubert et al. |
| 9,334,354 B2 | 5/2016 | Ferenz et al. |
| 9,346,919 B2 | 5/2016 | Jazkewitsch et al. |
| 9,353,225 B2 | 5/2016 | Knott et al. |
| 9,481,695 B2 | 11/2016 | Knott et al. |
| 9,540,500 B2 | 1/2017 | Ferenz et al. |
| 9,738,797 B2 | 8/2017 | Nilewski et al. |
| 9,783,635 B2 | 10/2017 | Schubert et al. |
| 9,790,327 B2 | 10/2017 | Klotzbach et al. |
| 9,896,541 B2 | 2/2018 | Fiedel et al. |
| 10,087,278 B2 | 10/2018 | Lobert et al. |
| 10,106,644 B2 | 10/2018 | Fiedel et al. |
| 10,106,649 B2 | 10/2018 | Fiedel et al. |
| 10,287,454 B2 | 5/2019 | Klotzbach et al. |
| 10,399,051 B2 | 9/2019 | Favresse et al. |
| 10,399,998 B2 | 9/2019 | Knott et al. |
| 10,407,592 B2 | 9/2019 | Amajjahe et al. |
| 10,414,871 B2 | 9/2019 | Knott et al. |
| 10,414,872 B2 | 9/2019 | Knott et al. |
| 10,519,280 B2 | 12/2019 | Knott et al. |
| 10,526,454 B2 | 1/2020 | Knott et al. |
| 10,544,267 B2 | 1/2020 | Knott et al. |
| 10,577,512 B2 | 3/2020 | Aitha et al. |
| 10,752,801 B2 | 8/2020 | Favresse et al. |
| 2004/0062734 A1 | 4/2004 | Dudzik et al. |
| 2004/0132951 A1 | 7/2004 | Burkart et al. |
| 2004/0147703 A1 | 7/2004 | Burkhart et al. |
| 2004/0229964 A1 | 11/2004 | Knott et al. |
| 2005/0075468 A1 | 4/2005 | Knott et al. |
| 2005/0257717 A1 | 11/2005 | Knott et al. |
| 2006/0155089 A1 | 7/2006 | Ferenz et al. |
| 2007/0043193 A1 | 2/2007 | Henning et al. |
| 2007/0049717 A1 | 3/2007 | Knott et al. |
| 2007/0128143 A1 | 6/2007 | Gruning et al. |
| 2008/0153934 A1 | 6/2008 | Neumann et al. |
| 2008/0153992 A1 | 6/2008 | Knott et al. |
| 2008/0153995 A1 | 6/2008 | Knott et al. |
| 2008/0221276 A1 | 9/2008 | Schwab et al. |
| 2009/0030097 A1 | 1/2009 | Knott et al. |
| 2009/0137751 A1 | 5/2009 | Knott et al. |
| 2009/0137752 A1 | 5/2009 | Knott et al. |
| 2010/0041910 A1 | 2/2010 | Schubert et al. |
| 2010/0056649 A1 | 3/2010 | Henning et al. |
| 2010/0071849 A1 | 3/2010 | Knott et al. |
| 2010/0081781 A1 | 4/2010 | Schubert et al. |
| 2010/0105843 A1 | 4/2010 | Knott et al. |
| 2010/0113633 A1 | 5/2010 | Henning et al. |
| 2010/0168367 A1 | 7/2010 | Schubert et al. |
| 2010/0184913 A1 | 7/2010 | Ebbrecht et al. |
| 2010/0249339 A1 | 9/2010 | Henning et al. |
| 2010/0292357 A1 | 11/2010 | Knott et al. |
| 2010/0298455 A1 | 11/2010 | Henning et al. |
| 2011/0021693 A1 | 1/2011 | Henning et al. |
| 2011/0034576 A1 | 2/2011 | Henning et al. |
| 2011/0042004 A1 | 2/2011 | Schubert et al. |
| 2011/0046305 A1 | 2/2011 | Schubert et al. |
| 2011/0144269 A1 | 6/2011 | Kuppert et al. |
| 2011/0172373 A1 | 7/2011 | Knott et al. |
| 2011/0230619 A1 | 9/2011 | Kuppert et al. |
| 2011/0230633 A1 | 9/2011 | Ferenz et al. |
| 2011/0245412 A1 | 10/2011 | Schubert et al. |
| 2011/0281973 A1 | 11/2011 | Schubert et al. |
| 2011/0301254 A1 | 12/2011 | Knott et al. |
| 2012/0010302 A1 | 1/2012 | Hartung et al. |
| 2012/0037036 A1 | 2/2012 | Veit et al. |
| 2012/0067520 A1 | 3/2012 | Schubert et al. |
| 2012/0068110 A1 | 3/2012 | Schubert et al. |
| 2012/0071564 A1 | 3/2012 | de Gans et al. |
| 2012/0097883 A1 | 4/2012 | Henning et al. |
| 2012/0282210 A1 | 11/2012 | Henning et al. |
| 2012/0296125 A1 | 11/2012 | Schubert et al. |
| 2012/0308494 A1 | 12/2012 | Schubert et al. |
| 2013/0035408 A1 | 2/2013 | Knott et al. |
| 2013/0213267 A1 | 8/2013 | Fiedel et al. |
| 2013/0217907 A1 | 8/2013 | Henning et al. |
| 2013/0217930 A1 | 8/2013 | Haensel et al. |
| 2013/0237616 A1 | 9/2013 | Ferenz et al. |
| 2013/0261201 A1 | 10/2013 | Knott et al. |
| 2013/0281552 A1 | 10/2013 | Nilewski et al. |
| 2013/0345318 A1 | 12/2013 | Schubert et al. |
| 2014/0274863 A1 | 9/2014 | Trosin et al. |
| 2014/0303065 A1 | 10/2014 | Jazkewitsch et al. |
| 2014/0309446 A1 | 10/2014 | Amajjahe et al. |
| 2015/0004112 A1 | 1/2015 | Ritter et al. |
| 2015/0004113 A1 | 1/2015 | Ritter et al. |
| 2015/0023900 A1 | 1/2015 | Knott et al. |
| 2015/0057369 A1 | 2/2015 | Ferenz et al. |
| 2015/0057412 A1 | 2/2015 | Knott et al. |
| 2016/0053051 A1 | 2/2016 | Schubert et al. |
| 2016/0130402 A1 | 5/2016 | Schubert et al. |
| 2016/0160009 A1 | 6/2016 | Ferenz et al. |
| 2016/0160081 A1 | 6/2016 | Klotzbach et al. |
| 2016/0208050 A1 | 7/2016 | Klotzbach et al. |
| 2017/0081464 A1 | 3/2017 | Fiedel et al. |
| 2017/0081469 A1 | 3/2017 | Fiedel et al. |
| 2017/0088667 A1 | 3/2017 | Fiedel et al. |
| 2017/0198099 A1 | 7/2017 | Knott |
| 2017/0226285 A1 | 8/2017 | Lobert et al. |
| 2017/0274335 A1 | 9/2017 | Favresse et al. |
| 2018/0016392 A1 | 1/2018 | Lobert et al. |
| 2018/0094146 A1 | 4/2018 | Aitha et al. |
| 2018/0134850 A1 | 5/2018 | Knott et al. |
| 2018/0258228 A1 | 9/2018 | Amajjahe et al. |
| 2018/0305596 A1 | 10/2018 | Schubert et al. |
| 2018/0319823 A1 | 11/2018 | Knott et al. |
| 2018/0355114 A1 | 12/2018 | Knott et al. |
| 2018/0355115 A1 | 12/2018 | Knott et al. |
| 2019/0031880 A1 | 1/2019 | Cavaleiro et al. |
| 2019/0040205 A1 | 2/2019 | Knott et al. |
| 2019/0048228 A1 | 2/2019 | Amajjahe et al. |
| 2019/0092904 A1 | 3/2019 | Fiedel et al. |
| 2019/0106369 A1 | 4/2019 | Schubert et al. |
| 2019/0106441 A1 | 4/2019 | Knott et al. |
| 2019/0112502 A1 | 4/2019 | Sloot et al. |
| 2019/0194488 A1 | 6/2019 | Favresse et al. |
| 2019/0241741 A1 | 8/2019 | Seyfried et al. |
| 2019/0248959 A1 | 8/2019 | Knott et al. |
| 2019/0292404 A1 | 9/2019 | Fiedel et al. |
| 2020/0055991 A1 | 2/2020 | Knott et al. |
| 2020/0055992 A1 | 2/2020 | Knott et al. |
| 2021/0301099 A1 | 9/2021 | Knott et al. |

FOREIGN PATENT DOCUMENTS

| | | |
|---|---|---|
| EP | 1 350 804 | 10/2003 |
| EP | 3 438 158 | 2/2019 |
| EP | 3 492 513 | 6/2019 |
| EP | 3 611 215 | 2/2020 |
| WO | 2007/060070 | 5/2007 |
| WO | 2010/046181 | 4/2010 |
| WO | 2013/010747 | 1/2013 |
| WO | 2018/134291 | 7/2018 |
| WO | 2019/105608 | 6/2019 |
| WO | 2019/219446 | 11/2019 |
| WO | 2019/219452 | 11/2019 |
| WO | 2020/114762 | 6/2020 |

OTHER PUBLICATIONS

U.S. Appl. No. 13/153,622, filed Jun. 6, 2011, 2011/0301254, Knott et al.

U.S. Appl. No. 13/205,834, filed Aug. 9, 2011, 2012/0037036, Veit et al.

U.S. Appl. No. 13/322,477, filed Nov. 25, 2011, 2012/0068110, Schubert et al.

(56) References Cited

OTHER PUBLICATIONS

U.S. Appl. No. 13/521,351, filed Jul. 10, 2012, 2012/0282210, Henning et al.
U.S. Appl. No. 13/771,921, filed Feb. 20, 2013, 2013/0213267, Fiedel et al.
U.S. Appl. No. 13/771,973, filed Feb. 20, 2013, 2013/0217930, Haensel et al.
U.S. Appl. No. 13/923,896, filed Jun. 21, 2013, 2013/0345318, Schubert et al.
U.S. Appl. No. 14/313,209, filed Jun. 24, 2014, 2015/0004112, Ritter et al.
U.S. Appl. No. 14/313,288, filed Jun. 24, 2014, 2015/0004113, Ritter et al.
U.S. Appl. No. 14/355,239, filed Apr. 30, 2014, 2014/0309446, Amajjahe et al.
U.S. Appl. No. 14/896,781, filed Jun. 16, 2014, 2016/0130402, Schubert et al.
U.S. Appl. No. 15/314,585, filed Nov. 29, 2016, 2017/0198099, Wilfried Knott.
U.S. Appl. No. 15/540,605, filed Jun. 29, 2017, 2018/0016392, Lobert et al.
U.S. Appl. No. 15/743,232, filed Jun. 9, 2018, 2019/0292404, Fiedel et al.
U.S. Appl. No. 15/760,855, filed Mar. 16, 2018, 2018/0258228, Amajjahe et al.
U.S. Appl. No. 15/767,894, filed Apr. 12, 2018, 2018/0305596, Schubert et al.
U.S. Appl. No. 16/044,960, filed Jul. 25, 2018, 2019/0031880, Cavaleiro et al.
U.S. Appl. No. 16/087,762, filed Sep. 24, 2018, 2019/0106369, Schubert et al.
U.S. Appl. No. 16/140,573, filed Sep. 25, 2018, 2019/0106441, Knott et al.
U.S. Appl. No. 16/142,408, filed Sep. 26, 2018, 2019/0112502, Sloot et al.
U.S. Appl. No. 16/143,543, filed Sep. 27, 2018, 2019/0092904, Fiedel et al.
U.S. Appl. No. 16/268,606, filed Feb. 6, 2019, 2019/0241741, Seyfried et al.
U.S. Appl. No. 16/456,101, filed Jun. 28, 2019, 2020/0055992, Knott et al.
U.S. Appl. No. 16/458,226, filed Jul. 1, 2019, 2020/0055991, Knott et al.
U.S. Appl. No. 17/177,489, filed Feb. 17, 2021, 2021/0301099, Knott et al.

* cited by examiner

TAILORED SIOC-BASED POLYETHERSILOXANES

CROSS-REFERENCE TO RELATED APPLICATION

The present application claims the benefit to European application EP 19176888.6, filed on May 28, 2019, the content of which is hereby incorporated by reference in its entirety.

BACKGROUND OF THE INVENTION

Field of the Invention

The invention relates to a process for preparing SiOC-based polyethersiloxanes proceeding from acetoxysiloxanes and also to the use thereof as constituents in interface-active substances, such as in PU foam stabilizers, defoamers, deaerating agents, in emulsifiers, in demulsifiers and in paint and levelling additives.

The terms "siloxanes" and "polysiloxanes", whether as part of a word or alone, are understood to be synonyms in the present invention.

The term "defoamer" in the present case encompasses both products and formulations that prevent foam and also those that destroy foam and enable deaeration. In practice, the transitions between these product properties are blurred, so that here the common collective term defoamer is used.

Discussion of the Background

In many industrial processes, in particular when work is being carried out in aqueous media, it is necessary to suppress or to completely prevent the undesired formation of foam during the production or processing operations, since foam or heads of froth which form during stirring and dispersing operations or form in the containers during the filling operation can lengthen the production times or reduce the effective volume of the plant or even prevent correct operation thereof, in that overflowing of the formulation out of the mixing tank cannot be avoided and a lack of colour transfer during the application thereof is unavoidable.

This can be achieved by adding defoamers which even at very low use concentrations of from approximately 0.001% by weight are capable of avoiding or destroying undesired foams and which at the same time do not cause any surface defects after application of the systems and suppress air inclusions in the paint. In practice, these aspects must be taken into account at least just as much as good defoaming.

Surface defects are to be understood to be features that are undesirable to the user such as for example pinholes, craters, loss of gloss, orange peel effect, wrinkling and loss of adhesion in the coating system. However, an appropriate long-term stability of the defoamer in formulations is also of high importance to the user since products such as paints are often not used up immediately but instead sometimes only after a relatively long storage. In the case of storage under extreme climatic conditions (heat and solar irradiation), the efficacy of a defoamer formulation can occasionally collapse after only a short time.

Defoamers according to the related art are for example silicone oils, native oils, paraffin and mineral oils, but also hydrophobic polyoxyalkylenes, long-chain alcohols and also mixtures of these products with one another and emulsions thereof.

Defoamers for defoaming aqueous and non-aqueous media and comprising polyoxyalkylene polysiloxane polymers as the active agent with a crucial influence on the defoaming exhibit particular efficacy and storage stability. This includes foam inhibition, defoaming, very good long-term stability, and also outstanding compatibility in aqueous and non-aqueous media. All of these properties are of high importance for modern paint applications.

For the purposes of increasing the efficacy, what are known as hydrophobic solids are frequently also added in amounts of 0.1% to 10% by weight, which promote dewetting processes in a targeted manner at foam lamellae and hence assist the foam collapse very effectively. Suitable hydrophobic solids are corresponding hydrophobized or non-hydrophobized silicas, hydrophobized or non-hydrophobized precipitated silica, metal carboxylates such as metal stearates, polyolefins and natural or synthetic waxes such as paraffin waxes, polyolefin waxes, amide waxes and urea or poly-(ureas), such as described for example in DE 28 29 906 A1.

By means of addition of suitable emulsifiers or protective colloids, such defoamer formulations can also be converted into aqueous emulsions which can be formulated more simply in paint formulations in terms of application. CN 101100515 A discusses a specific emulsification process, which can likewise be used for the emulsification of the polyether polysiloxane polymers.

It is likewise known to use polyoxyalkylene polysiloxane block copolymers as defoaming agents. For instance, DE 1 012 602 by way of example describes polyoxyalkylene polysiloxane polymers having an A'-B'-A' structure, where A' denotes the polyoxyalkylene blocks and B' denotes a polysiloxane block. These active agents are assigned to the so-called SiOC polyethersiloxane defoamer substance class.

DE 24 43 853 describes defoaming preparations which comprise not only linear but also branched polyoxyalkylene polysiloxane block copolymers.

U.S. Pat. No. 4,028,218 describes a process for preventing or destroying foam in aqueous solutions or dispersions, which uses a similar preparation as that described in DE 24 43 853. The preparation essentially differs in an additional content of organic oil which likewise has a defoaming action. Suitable organic oils are the esters of alcohols and fatty acids, such as for example vegetable or animal oils, or mineral oils, polybutadiene oils or polypropylene glycols.

According to the current state of the art, a plurality of process variants is used for the preparation of the economically important substance class of the SiOC-linked polyethersiloxanes, also referred to as silicone polyethers or polysiloxane polyether copolymers.

It is known to those skilled in the art that these SiOC-linked polyethersiloxanes are a product class which does not have a tendency to become a resin. Even if SiOC-linked polyethersiloxanes contain reactive groups such as hydroxy groups, they are not used for the targeted crosslinking. In contrast to silicone resins, they are not film-forming.

SiOC-linked polyethersiloxanes are classically formed by the reaction of a polysiloxane having a leaving group (e.g. halogen) bonded to the silicon atom and an alcohol or polyetherol. The latter is typically obtained beforehand by alkoxylation of hydroxy-functional starter compounds such as for example methanol, butanol or glycol with alkylene oxides. Chlorine as leaving group on the silicon atom is in particular known and widespread as starting compounds for this type of reaction. However, chlorosiloxanes and chloropolysiloxanes are difficult to handle as they are extremely reactive. The use thereof is additionally associated with the disadvantage that hydrogen chloride formed in the course of the reaction necessitates corrosion-resistant installations and results in both technical and environmental challenges. Moreover, organic chlorine compounds which are undesirable for toxicological reasons can be formed in the presence of chloropolysiloxanes and alcohols or polyetherols, such that in the production process there are the requirements of suppressing and destroying these. As is known to those skilled in the art, it is also necessary in the case of the reaction of a chlorosiloxane with an alcohol or polyetherols to achieve and to ensure a quantitative conversion, with the result that the OH-functional component often needs to be used in a stoichiometric excess based on the chlorine leaving group of the polysiloxane component. In practice, the use of a polyether excess means that the polyethersiloxanes thus prepared unavoidably contain relatively large amounts of unreacted excess polyethers which lower the concentration of the active polyethersiloxane component and impair the performance properties of the polyethersiloxanes. It is frequently additionally necessary to use HCl scavengers in the above-described process in order to achieve suitable quantitative conversions. The use of HCl scavengers results in the formation of large quantities of salt, the removal of which on an industrial scale causes problems.

One possible alternative to this process comprises reacting alcohols or polyetherols with hydrosiloxanes in which hydrogen is directly bonded to silicon. Under suitable conditions the formation of the SiOC bond here results merely in elimination of hydrogen. This process, known as dehydrogenative condensation, can be performed exclusively only in the presence of a catalyst. U.S. Pat. No. 5,147,965 refers to a process described in the Japanese patent publication JPS 4819941, in which a hydrosiloxane is reacted with an alcohol with the addition of alkali metal hydroxides or alkali metal alkoxides. A disadvantage with this process is that the catalysts have to be neutralized after reaction is complete and the salt load formed in the process, although it is much lower than that of the chlorosiloxane process, nevertheless requires complicated removal by filtration.

EP 0 475 440 describes a process in which hydrosiloxanes are reacted with an alcohol with addition of an organic acid in the presence of a Pt salt. The reaction unavoidably requires the use of large amounts of organic acid (0.1 to 1 mol based on alcohol), toluene as solvent and a platinum salt. Since both toluene and acid are undesirable in the end product, they must be removed again after the end of the reaction. In addition, platinum salts are not only expensive but also not unproblematic from a physiological viewpoint. Specifically in the cosmetics industry sector, there is a demand for platinum-free products.

The process described in J. Boyer, R. J. P. Corriu, R. Perz, C. Reye, J. Organomet. Chem, 1978, 157, 153-162 does not require the use of heavy metals. Salts such as potassium tartrate, phthalate or formate for example are used as heterogeneous catalysts in this document. However, the reactions require equimolar use of the salts based on the SiH units and are successful only at high temperatures of approx. 180° C. Both the drastic conditions and the large quantities of salt required render this process unattractive for the technical and industrial scale.

Patent applications DE 10 312 636 and DE 10 359 764 utilize boron-containing catalysts for the dehydrogenative condensation of hydrosiloxanes and alcohols. As much as these dehydrogenative processes for SiOC linking are attractive, specifically in relation to the avoidance of liquid and/or solid by-products, both the use of costly and toxic catalysts such as for example tris(pentafluorophenyl)borane and the safe handling of the hydrogen gas formed in the synthesis stand in the way of widespread application of the technology on an industrial scale.

Polyethersiloxanes are therefore synthesized by means of the linkage of polyether to a polysiloxane chain via an Si—OC or Si—C bond. At this point, the chemistry offers manifold possibilities of different polyethersiloxane structures. Accordingly, it is not only possible to use linear structures, which are grouped into two subclasses: the A-B-A triblock copolymer structures and the A-(B-A)x multiblock copolymer structures, but it is also possible to synthesize slightly or heavily branched copolymer structures and comb-type copolymers.

The related art discloses numerous synthesis methods. By way of example, EP 2094761 B1 discloses the preparation of polyoxyalkylene polysiloxane block polymers via the reaction of polyether alcohols with chloropolysiloxanes as starting compounds.

With reference to EP 3467006 A1 and also the as-yet unpublished European patent applications with the application references EP 18172882.5, EP 18172876.7 and EP 17204277.2, which are concerned with the preparation of SiOC-linked polyethersiloxanes, wherein trifluoromethanesulfonic acid-acidified, equilibrated acetoxysiloxanes of the linear or branched structural type are used as reactive intermediates, the teaching of the likewise unpublished European patent application EP 18189073.2 is geared towards a process for the preparation of trifluoromethanesulfonic acid-acidified, end-equilibrated acetoxy group-bearing polysiloxanes in which cyclic siloxanes, in particular comprising $D_4$ and/or $D_5$, and/or mixtures of cyclic branched siloxanes of the D/T type are reacted with acetic anhydride while using trifluoromethanesulfonic acid as catalyst and with addition of acetic acid.

The as-yet unpublished European patent applications having application references EP 17204277.2, EP 18189072.4 and EP 18189074.0 are geared towards processes for preparing acetoxy-modified siloxanes in which DT siloxane cycles and simple siloxane cycles containing only D units, respectively, are used as reactants.

EP 17204277.2 relates to a process for preparing SiOC-linked polyethersiloxanes which are branched in the siloxane portion proceeding from mixtures of cyclic branched polysiloxanes of the D/T type, by, in a first step, reacting cyclic branched siloxanes of the D/T type with acetic anhydride, optionally in admixture with simple siloxane cycles, under acid catalysis to form acetoxy group-bearing branched polysiloxanes, and in a second step equilibrating the acetoxy-modified, branched polysiloxane with trifluoromethanesulfonic acid, and in a third step reacting the trifluoromethanesulfonic acid-acidified acetoxysiloxane with polyetherols optionally in the presence of bases and optionally in the presence of an inert solvent. The branched acetoxysiloxane obtained here contains, besides trifluoromethanesulfonic acid used, also about 0.10 mol of free acetic anhydride per mole of Si-bonded acetoxy function.

The as-yet unpublished European patent applications with application references EP 18189072.4 and EP 18189074.0, aiming not for branched but linear SiOC-linked silicone polyether structures, to this end state that equilibrated α,ω-diacetoxypolydimethylsiloxanes are prepared via the reaction of siloxane cycles ($D_4$/$D_5$) with acetic anhydride in the presence of trifluoromethanesulfonic acid by contacting the reactants with 0.1 to 0.3 percent by mass of trifluoromethanesulfonic acid based on the entire reaction mass while mixing the reactants well and then heating to temperatures of 140 to 160° C. for a duration of 4 to 8 hours. Here, the initially slightly cloudy reaction mixture affords a clear, equilibrated trifluoromethanesulfonic acid-catalysed α,ω-diacetoxypolydimethylsiloxane which, besides trifluoromethanesulfonic acid used, also contains 0.125 mol of free acetic anhydride based on the acetic anhydride equivalent chemically bonded in the α,ω-diacetoxypolydimethylsiloxane.

The as-yet unpublished European patent application EP18210035.4 describes (i) reaction systems for the preparation of siloxanes bearing acetoxy functions, comprising a) silanes and/or siloxanes bearing alkoxy groups and/or b) silanes and/or siloxanes bearing acetoxy groups, c) silanes and/or siloxanes bearing hydroxy groups, d) optionally simple siloxane cycles and/or DT cycles, e) a reaction medium, comprising acetic anhydride, perfluoroalkanesulfonic acid and preferably acetic acid, (ii) a process for preparing linear or branched siloxanes bearing acetoxy functions and also the use of same for preparing polyethersiloxanes.

According to the application identified above, it is for example possible to arrive at a linear or branched polysiloxane bearing terminal acetoxy groups by reacting a linear polysilicone equilibrate pre-equilibrate) bearing terminal alkoxy groups as sole reactant with a reaction medium consisting of acetic anhydride, trifluoromethanesulfonic acid and acetic acid.

It is also known to those skilled in the art that the polysiloxane is responsible for the interfacial activity, whereas the compatibility with the paint system is controlled and correspondingly influenced via the polyether. The polyethersiloxane structures enabling the best performance properties must always be determined practically according to the current state of affairs, because this always depends on the composition of the medium to be defoamed.

It is therefore desirable to provide a process with which defined polyether polysiloxane structures can be produced simply and without the disadvantages known from the related art.

SUMMARY OF THE INVENTION

The present application includes the following embodiments:
1. Process for preparing SiOC-based polyethersiloxanes proceeding from linear α,ω-hydroxy group-bearing siloxanes, characterized in that it comprises
   in a first step, preparing α,ω-acetoxy group-bearing linear polysiloxanes,
   in a second step, converting the α,ω-acetoxy group-bearing linear polysiloxanes with desired organosiloxane units, preferably the number of organosiloxane units in the polysiloxane chain being reduced, wherein the thus converted α,ω-acetoxy group-bearing linear polysiloxanes have α,ω-acetoxy groups, and
   in a third step, reacting the α,ω-acetoxy group-bearing linear polysiloxanes from step 2 with polyetherols to give SiOC-based polyethersiloxanes,
2. Process according to embodiment 1, characterized in that it comprises
   in a first step, reacting linear α,ω-hydroxy group-bearing polysiloxanes with acetic anhydride to give acetoxy group-bearing linear polysiloxanes,
   in a second step, equilibrating the acetoxy-modified, linear polysiloxanes from step 1 with a mixture containing acetic anhydride and acids, preferably superacids, in order to obtain α,ω-acetoxy group-bearing linear polysiloxanes with desired organosiloxane units.
3. Process according to embodiment 1 or 2, characterized in that the linear α,ω-hydroxy group-bearing siloxanes satisfy at least formula (I):

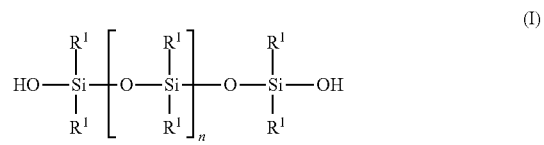

where $R^1$ is an alkyl radical and/or aromatic radical, comprising 1 to 10 carbon atoms, preferably a methyl radical and where $1 \leq n \leq 19\,000$, preferably n is between 3 and 200, particularly preferably n is between 20 and 100.
4. Process according to any of the preceding embodiments, characterized in that the acids used in step 2 are superacids having a pKa of less than −3.0, preferably fluorinated and/or perfluorinated sulfonic acids, fluorosulfonic acid $HSO_3F$, fluoroantimonic acid $HSbF_6$, perfluorobutanesulfonic acid $C_4F_9SO_3H$ and/or very particularly preferably trifluoromethanesulfonic acid $CF_3SO_3H$.
5. Process according to any of the preceding embodiments, characterized in that the linear α,ω-acetoxy group-bearing polysiloxanes converted in step 2 have 5-50, preferably 7-25, particularly preferably 10-20 organosiloxane units.
6. Process according to any of the preceding embodiments, characterized in that in the second step silanes bearing alkoxy groups are additionally added, preferably triethoxy-, trimethoxy-, diethoxy-, dimethoxy-, tetraethoxy- and/or tetramethoxysilane, in order to obtain branched α,ω-acetoxy group-bearing polysiloxanes.
7. Process according to any of the preceding embodiments, characterized in that in a third step the acidic, preferably superacidic, α,ω-acetoxy group-bearing polysiloxane from step 2 is reacted with polyetherols and/or monools.
8. Process according to any of the preceding embodiments, characterized in that acetic acid is added in step 2.
9. Process according to any of the preceding embodiments, wherein the replacement of the siloxane-bonded acetoxy groups is done at least in the presence of a base, in particular in the presence of carbonate salts, ammonia or of an organic amine.
10. Process according to any of the preceding embodiments, wherein the replacement of the siloxane-bonded acetoxy groups via the reaction with polyetherols is effected using an inert solvent, preferably using a solvent which is inert and at the same time forms an azeotrope with formed, and possibly already present, acetic acid, wherein the inert solvent is advantageously an aromatic, preferably alkylaromatic solvent and very particularly preferably selected from toluene, xylene and esters selected from methoxypropyl acetate, ethyl acetate or butyl acetate.
11. Process according to any of embodiments 1 to 9, wherein the replacement of the siloxane-bonded acetoxy groups via the reaction with polyetherols is done without solvent.
12. Process according to any of the preceding embodiments, wherein the polyetherols used are preferably those of formula (II)

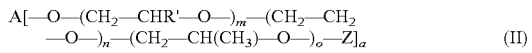

where
A is either hydrogen or a saturated or unsaturated organic radical comprising at least one carbon atom, preferably an organic radical comprising at least one carbon atom of an organic starter compound for preparing the compound, particularly preferably a methyl, ethyl, propyl, isopropyl, butyl, isobutyl, vinyl or allyl group, R' is independently a saturated alkyl group comprising 2-18 carbon atoms or an aromatic radical, preferably an ethyl group or a phenyl radical respectively, Z is hydrogen, m equals from 0 to 50, preferably from 0 to 30, particularly preferably from 0 to 20, n equals from (from 0 to 250, preferably from 3 to 220, particularly preferably from 5 to 200, o equals from 0 to 250, preferably from 3 to 220, particularly preferably from 5 to 200, a equals from 1 to 8, preferably from greater than 1 to 6, particularly preferably 1, 2, 3 or 4, with the proviso that the sum of m, n and o is equal to or greater than 1 and with the proviso that at least A or Z represent hydrogen.

13. Process according to any of the preceding embodiments, characterized in that the monools are selected from ethanol, propanol, isopropanol, butanol, isobutanol and polyetherol of formula (H), where A does not correspond to hydrogen.

14. Process according to embodiment 1 to 12, wherein at least 1 mol of polyether-bonded OH functionality is used per mole of acetoxy group of the branched siloxane, preferably 1 to 2 mol of polyether-bonded OH functionality, preferably 1.1 to 1.6 mol of polyether-bonded OH functionality, particularly preferably 1.2 to 1.4 mol of polyether-bonded OH functionality, per mole of acetoxy group of the branched siloxane.

15. Process according to any of the preceding embodiments, characterized in that the transesterification of the acetoxy group-bearing polysiloxanes from step 2 is conducted in a solvent which is inert under reaction conditions, wherein preferred solvents are toluene and/or xylenes present in pure form or as an isomer mixture, and wherein these solvents are preferably used in total amounts of 5% to 35% by weight, preferably 10% to 35% by weight, based on the mass of the reaction matrix, and wherein the total water content of the solvents is ≤50 ppm by mass, preferably ≤25 ppm by mass, particularly preferably ≤10 ppm by mass, wherein the determination of the water content is performed by titration according to Karl Fischer.

16. Process according to any of the preceding embodiments, characterized in that the transesterification reaction is conducted in the temperature range from 40 to 180° C., preferably between 50 and 160° C., particularly preferably between 80 to 150° C.

17. Process according to any of the preceding embodiments, characterized in that the transesterification reaction is conducted at reduced pressure and/or while passing through an inert gas.

18. Preparation produced by a process of embodiments 1 to 17, containing at least one SiOC-linked, branched silicone polyether, a polyetherol and a polyether endcapped with an acetyl group, with the proviso that the polyether radical present in the silicone polyether is chemically identical to the polyether radical of the polyetherol and to the polyether radical of the polyether endcapped with an acetyl group, and that the proportion of the SiOC-linked, branched silicone polyether is at least 50 percent by mass based on the total preparation.

19. Use of the preparation according to embodiment 18 for the production of defoamers, deaerating agents, foam stabilizers, wetting agents, paint and levelling additives or as demulsifiers.

20. Use of the preparation according to embodiment 18 for the production of diesel defoamers, of hydrophobizing agents, of polymer dispersions, of adhesives or sealants, of paper towels; of cleaning and care formulations for the household or for industrial applications, in particular for the production of fabric softeners, of cosmetic, pharmaceutical and dermatological compositions, in particular cosmetic cleansing and care formulations, hair treatment agents and hair aftertreatment agents; of construction material compositions, of thermoplastic shaped bodies.

21. Use of the preparation according to embodiment 18 as processing aid in the extrusion of thermoplastics, as adjuvant in crop protection, as additive for the cleaning and care of hard surfaces, for the surface treatment of fibres, particles or fabrics, in particular for the finishing or impregnation of textiles, or in the coating of fillers.

DETAILED DESCRIPTION OF THE INVENTION

Based on the teaching of European patent application EP 18210035.4, the present invention proposes a process for preparing SiOC-based polyethersiloxanes proceeding from linear α,ω-hydroxy group-bearing polysiloxanes, wherein the method comprises a first step, preparing α,ω-acetoxy group-bearing linear polysiloxanes, in a second step, converting the α,ω-acetoxy group-bearing linear polysiloxanes with desired organosiloxane units, preferably the number of organosiloxane units in the polysiloxane chain being reduced, wherein the thus converted α,ω-acetoxy group-bearing linear polysiloxanes have α,ω-acetoxy groups, and in a third step, reacting the α,ω-acetoxy group-bearing linear polysiloxanes from step 2 with polyetherols to give SiOC-based polyethersiloxanes.

It has been found that, surprisingly, the process regime according to the invention is suitable for the preparation of tailored SiOC-based polyethersiloxanes.

It is particularly surprising here that the length of the polysiloxane chain can be influenced prior to the reaction with polyetherols. Commercially available linear α,ω-hydroxy group-bearing polysiloxanes have a relatively long polysiloxane chain, which need to be adapted for the reaction with polyetherols with respect to the required performance properties in the medium to be defoamed.

Preferably, a process is proposed which comprises in a first step, reacting linear α,ω-hydroxy group-bearing polysiloxanes with acetic anhydride to give acetoxy group-bearing linear polysiloxanes, in a second step, equilibrating the acetoxy-modified, linear polysiloxanes from step 1 with a mixture containing acetic anhydride and acids, preferably superacids, in order to obtain α,ω-acetoxy group-bearing linear polysiloxanes with desired organosiloxane units.

Those skilled in the art can gather the suitable amount of acetic anhydride and acids in the second step from their specialist knowledge, with them ensuring here that the converted α,ω-acetoxy group-bearing linear polysiloxanes have α,ω-acetoxy groups. They can use $^{29}$Si NMR spectroscopy as an aid for reaction monitoring.

Acetic anhydride and acetic acid anhydride are understood to be synonyms.

Acetoxy-modified linear polysiloxanes, α,ω-acetoxy group-bearing linear polysiloxanes, and acetylated linear polysiloxanes are understood within the context of this invention to mean that the linear α,ω-hydroxy group-bearing polysiloxanes bear α,ω-acetoxy groups.

Surprisingly, it has been found that the molar ratio of the α,ω-acetoxy group-bearing linear polysiloxanes from step 1 can be adjusted using the molar ratio of the acetic anhydride in step 2, in order to obtain the α,ω-acetoxy group-bearing linear polysiloxanes with desired organosiloxane units.

The discovery that there is a law between the amount of acetic anhydride in step 2 and the desired polysiloxane chain length was completely surprising. For example, addition of one mole of acetic anhydride in step 2 to the α,ω-acetoxy group-bearing linear polysiloxanes from step 1 brings about a halving of the molecular weight of the α,ω-acetoxy group-bearing linear polysiloxane from step 1. Two α,ω-acetoxy group-bearing linear polysiloxanes with reduced molecular weight result. When adding, for example, 2 mol of acetic anhydride in step 2 to the α,ω-acetoxy group-bearing linear polysiloxanes from step 1, three α,ω-acetoxy group-bearing linear polysiloxanes with reduced molecular weight are formed.

Preferably, it is possible using the process according to the invention, in particular in the second step, to prepare, from the α,ω-acetoxy group-bearing linear polysiloxanes from step 1, having the initial molecular weight of the linear α,ω-hydroxy group-bearing polysiloxane, two or more α,ω-acetoxy group-bearing linear polysiloxanes with reduced molecular weight, or to reduce the number of organosiloxane units in the polysiloxane chain.

Without being bound to a theory, the law follows the following mathematical formula for the number of α, ω-acetoxy group-bearing linear polysiloxanes after step 2:

$$K = X + 1$$

where
K=number of α,ω-acetoxy group-bearing linear polysiloxanes with desired organosiloxane units after step 2
X=amount of acetic anhydride (in moles) in step 2.
For the molecular weight, the following mathematical formula could be used as a basis:

$$M = \frac{Y}{X+1}$$

M=molecular weight of the α,ω-acetoxy group-bearing linear polysiloxanes with desired organosiloxane units after step 2
Y=molecular weight of α,ω-acetoxy group-bearing linear polysiloxanes from step 1.
Preference is given to using the linear α,ω-hydroxy group-bearing siloxanes which satisfy at least formula (I):

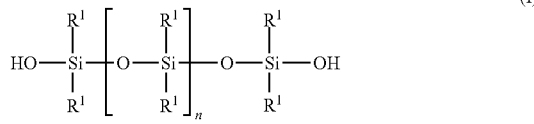

(I)

where $R^1$ is an alkyl radical and/or aromatic radical, comprising 1 to 10 carbon atoms, preferably a methyl radical and where $1 \leq n \leq 19,000$, preferably n is between 3 and 200, particularly preferably n is between 20 and 100.

Accordingly, the linear α,ω-hydroxy group-bearing polysiloxanes of formula (I) have a chain of periodically repeating organosiloxane units —$(R^1)_2$SiO—; The α,ω-hydroxy group-bearing polysiloxanes have a viscosity of 16 to 150,000 mPa*s and have a corresponding molecular weight of 400 to 139,000 g/mol.

Linear α,ω-hydroxy group-bearing polysiloxanes of formula (I) are also known under the simple term polysilanols.

Preferably, the acids used in step 2 are superacids having a pKa of less than −3.0, preferably fluorinated and/or perfluorinated sulfonic acids, fluorosulfonic acid $HSO_3F$, fluoroantimonic acid $HSbF_6$, perfluorobutanesulfonic acid $C_4F_9SO_3H$ and/or very particularly preferably trifluoromethanesulfonic acid $CE_3SO_3H$.

Preferably, the linear α,ω-acetoxy group-bearing polysiloxanes converted in step 2 have 5-50, preferably 7-25, particularly preferably 10-20 organosiloxane units. The number of units is determined by means of $^{29}$Si NMR, as known to those skilled in the art and as already described in the specialist literature.

Preferably, in the second step silanes bearing alkoxy groups can additionally be added, preferably triethoxy-, trimethoxy-, diethoxy-, dimethoxy-, tetraethoxy- and/or tetramethoxysilane, in order to obtain branched α,ω-acetoxy group-bearing siloxanes.

It is therefore possible to prepare branched SiOC-based polyethersiloxanes in an elegant and simple manner proceeding from linear polysiloxanes bearing hydroxy groups.

Preferably, in a third step the acidic, preferably superacidic, α,ω-acetoxy group-bearing polysiloxane from step 2 is reacted with polyetherols and/or monools. It is thus possible to prepare SiOC-based polyethersiloxanes having defined organosiloxane units which are suitable as defoamers for specific compositions.

Preferably, acetic acid can be added in step 2. As described in the above-mentioned, as-yet unpublished patent applications, acetic acid can play an important role for end equilibration.

Preferably, the replacement of the siloxane-bonded acetoxy groups is done at least in the presence of a base, in particular in the presence of carbonate salts, ammonia or of an organic amine, in order possibly to promote polycondensation, to neutralize the catalyst and/or to stabilize the end product.

Preferably, the replacement of the siloxane-bonded acetoxy groups via the reaction with polyetherols can be effected using an inert solvent, preferably using a solvent which is inert and at the same time forms an azeotrope with formed, and possibly already present, acetic acid, wherein the inert solvent is advantageously an aromatic, preferably alkylaromatic solvent and very particularly preferably selected from toluene, xylene and esters selected from methoxypropyl acetate, ethyl acetate or butyl acetate.

In another embodiment, the replacement of the siloxane-bonded acetoxy groups via the reaction with polyetherols can preferably be done without solvent.

Preferably, polyetherols used are those of formula (II)

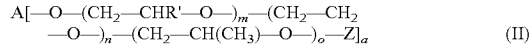

(II)

where
A is either hydrogen or a saturated or unsaturated organic radical comprising at least one carbon atom, preferably an organic radical comprising at least one carbon atom of an organic starter compound for preparing the compound, particularly preferably a methyl, ethyl, propyl, isopropyl, butyl, isobutyl, vinyl or allyl group, R' is independently a saturated alkyl group comprising 2-18 carbon atoms or an aromatic radical, preferably an ethyl group or a phenyl radical respectively, Z is hydrogen, m equals from 0 to 50, preferably from 0 to 30, particularly preferably from 0 to 20, n equals from 0 to 250, preferably from 3 to 220, particularly preferably from 5 to 200, o equals from 0to 250, preferably from 3 to 220, particularly preferably from 5 to 200, a equals from 1 to 8, preferably from greater than 1 to 6, particularly preferably 1, 2, 3 or 4.

with the proviso that the sum of m, n and o is equal to or greater than 1 and with the proviso that at least A or Z represent hydrogen.

The monools are preferably selected from ethanol, propanol, isopropanol, butanol, isobutanol and polyetherol of formula (II), where A does not correspond to hydrogen.

In a preferred embodiment, at least 1 mol of polyether-bonded OH functionality can be used per mole of acetoxy group of the branched siloxane, preferably 1 to 2 mol of polyether-bonded OH functionality, preferably 1.1 to 1.6 mol of polyether-bonded OH functionality, particularly preferably 1.2 to 1.4 mol of polyether-bonded OH functionality, per mole of acetoxy group of the branched siloxane.

The transesterification of the acetoxy group-bearing polysiloxanes from step 2 is preferably conducted in a solvent which is inert under reaction conditions, wherein preferred solvents are toluene and/or xylenes present in pure form or as an isomer mixture, and wherein these solvents are preferably used in total amounts of 5% to 35% by weight, preferably 10% to 35% by weight, based on the mass of the reaction matrix, and wherein the total water content of the solvents is ≤50 ppm by mass, preferably ≤25 ppm by mass, particularly preferably ≤10 ppm by mass, wherein the determination of the water content is performed by titration according to Karl Fischer.

The transesterification reaction is preferably conducted in the temperature range from 40 to 180° C., preferably between 50 and 160° C., particularly preferably between 80 to 150° C.

The transesterification reaction is preferably conducted at reduced pressure and/or while passing through an inert gas.

The invention further provides a preparation produced by the process according to the invention, containing at least one SiOC-linked, branched polysilicone polyether, a polyetherol and a polyether endcapped with an acetyl group, with the proviso that the polyether radical present in the silicone polyether is chemically identical to the polyether radical of the polyetherol and to the polyether radical of the polyether endcapped with an acetyl group, and that the proportion of the SiOC-linked, branched silicone polyether is at least 50 percent by mass based on the total preparation.

The invention also provides for the use of the preparation according to the invention for the production of defoamers, deaerating agents, foam stabilizers, wetting agents, paint and levelling additives or as demulsifiers.

The invention further provides for the use of the preparation according to the invention for the production of diesel defoamers, of hydrophobizing agents, of polymer dispersions, of adhesives or sealants, of paper towels; of cleaning and care formulations for the household or for industrial applications, in particular for the production of fabric softeners, of cosmetic, pharmaceutical and dermatological compositions, in particular cosmetic cleansing and care formulations, hair treatment agents and hair aftertreatment agents; of construction material compositions, of thermoplastic shaped bodies.

Also conceivable is the use of the preparation according to the invention as processing aid in the extrusion of thermoplastics, as adjuvant in crop protection, as additive for the cleaning and care of hard surfaces, for the surface treatment of fibres, particles or fabrics, in particular for the finishing or impregnation of textiles, or in the coating of fillers.

EXAMPLES

Methods

In the context of the present invention, the $^{29}$Si NMR samples were analysed at a measurement frequency of 79.49 MHz in a Bruker Avance III spectrometer equipped with a 287430 probe head with gap width of 10 mm, dissolved at 22° C. in $CDCl_3$ and against a tetramethylsilane (TMS) external standard [d($^{29}$Si)=0.0 ppm].

GPCs (gel permeation chromatography) were recorded using THF as the mobile phase on art SDV 1000/10000A column combination having a length of 65 cm, ID 0.80, at a temperature of 30° C. using a SECcurity$^2$GPC System 1260 (PSS Polymer Standards Service GmbH).

Preparation of Linear and Branched Acetoxy Group-Bearing Polysiloxanes

Step 1: Preparation of Linear Acetoxy Group-Bearing Polysiloxane Proceeding From Polysilanol Example 1A In a 500 ml four-neck round-bottom flask equipped with a precision glass stirrer, an internal thermometer, and a reflux condenser on top, 300.0 g of a polysilanol having a molecular weight of 2742 g/mol together with 22.4 g of acetic anhydride (0.22 mol) were initially charged at 23° C. while stirring. The mixture was subsequently heated to 150° C. and held at reaction temperature for 6 hours. After the reaction time, the reaction mixture was cooled down to 23° C.

In order to work up the reaction mixture, the reflux condenser was exchanged for a distillation bridge and the reaction mixture was subsequently distilled off for 2 hours under reduced pressure (20 mbar) at 80° C. Cooling of the reaction mixture afforded a clear colourless acetylated polysiloxane.

A clear terminal acetoxy group-bearing polysiloxane was obtained, the target structure of which was confirmed by the accompanying $^{29}$Si NMR spectroscopy. The $^{29}$Si NMR spectroscopy likewise assures that no contents whatsoever of SiOH groups are present, within the scope of measurement accuracy.

Conversion of the Linear Acetoxypolysiloxane Into the Corresponding Linear Isopropoxypolysiloxane for Analytical Characterization Immediately after the synthesis, in a 250 ml four-neck round-bottom flask equipped with a precision glass stirrer, an internal thermometer, and a reflux condenser on top, 100.0 g of this trifluoromethanesulfonic acid-acidified, equilibrated branched acetoxypolysiloxane were mixed together with 23.2 g of a molecular sieve-dried isopropanol at 22° C. with stirring. Gaseous ammonia ($NH_3$) was then introduced to the reaction mixture until alkaline reaction (moist universal indicator paper) and the mixture was then stirred at this temperature for a further 45 minutes. The precipitated salts were separated off using a fluted filter.

A colourless, clear liquid was isolated, the accompanying $^{29}$Si NMR spectrum of which confirms the quantitative conversion of the linear acetoxypolysiloxane into a linear isopropoxypolysiloxane.

An aliquot of this branched isopropoxypolysiloxane was withdrawn and analysed by gas chromatography. The gas chromatogram shows the following contents (reported in percent by mass):

| $D_4$ | $D_5$ | $D_5$ | Sum total ($D_4$-$D_6$) | Isopropanol content |
|---|---|---|---|---|
| 0.22% | 0.32% | 0.48% | 1.02% | 12.0% |

Taking the isopropanol excess into account, the contents of siloxane cycles ($D_4$, $D_5$ and $D_6$) are calculated here solely based on the polysiloxane proportion.

Further inventive acetoxy group-bearing polysiloxanes were prepared analogously using various polysilanols according to table 1.

TABLE 1

|  | 1A | 1A* | 1B | 1C | 1D |
|---|---|---|---|---|---|
| Polysilanol A (Mn = 2742 g/mol) | 300.0 g | 300.0 g | | | |
| Polysilanol B (Mn = 5490 g/mol) | | | 300.0 g | | |
| Polysilanol C (Mn = 1371 g/mol) | | | | 300.0 g | |
| Polysilanol D (Mn = 3398 g/mol) | | | | | 300.0 g |
| Acetic anhydride | 22.4 g | 44.7 g | 22.35 g | 89.4 g | 36.0 g |

Step 2: Preparation of Linear Acetoxy Group-Bearing Polysiloxane With Desired Organosiloxane Units/Reduced Molecular Weight Example 2C In a 500 ml four-neck round-bottom flask equipped with a precision glass stirrer, an internal thermometer, and a reflux condenser on top, 300.0 g of the linear acetoxypolysiloxane prepared in example 1C together with 20.8 g of acetic anhydride (0.20 mol) were initially charged at 23° C. while stirring. The mixture was subsequently heated to 150° C., with 0.32 g of trifluoromethanesulfonic acid additionally being added thereto during the heating. A total reaction time of 6 hours was held and allowed the reaction mixture to cool down to 80° C. 9.6 g of sodium carbonate were added to the reaction mixture at this temperature, the mixture was stirred for 6 hours and then subjected to extractive distillation at 80° C. under 20 mbar vacuum for 2 hours. The salts were separated off using a fluted filter. Cooling of the reaction mixture afforded a clear colourless acetylated polysiloxane.

The target structure of the clearly linear polysiloxane bearing acetoxy functions was confirmed by the accompanying $^{29}$Si NMR spectroscopy. The $^{29}$Si NMR spectroscopy likewise assures that no contents whatsoever of SiOH groups are present, within the scope of measurement accuracy.

Conversion of the linear acetoxypolysiloxane into the corresponding linear isopropoxysiloxane for analytical characterization. A molecular weight of 737 was determined for the acetylated linear polysiloxane thus prepared.

Immediately after the synthesis, in a 250 ml four-neck round-bottom flask equipped with a precision glass stirrer, an internal thermometer, and a reflux condenser on top, 100.0 g of this trifluoromethanesulfonic acid-acidified, equilibrated linear acetoxypolysiloxane were mixed together with 23.2 g of a molecular sieve-dried isopropanol at 22° C. with stirring. Gaseous ammonia ($NH_3$) was then introduced to the reaction mixture until alkaline reaction (moist universal indicator paper) and the mixture was then stirred at this temperature for a further 45 minutes. The precipitated salts were separated off using a fluted filter.

A colourless, clear liquid was isolated, the accompanying $^{29}$Si NMR spectrum of which confirms the quantitative conversion of the linear acetoxypolysiloxane into a linear isopropoxypolysiloxane.

An aliquot of this branched isopropoxysiloxane was withdrawn and analysed by gas chromatography. The gas chromatogram shows the following contents (reported in percent by mass):

| $D_4$ | $D_5$ | $D_6$ | Sum total ($D_4$-$D_6$) | Isopropanol content |
|---|---|---|---|---|
| 0.19% | 0.33% | 0.39% | 0.91% | 12.10% |

Taking the isopropanol excess into account, the contents of siloxane cycles ($D_4$, $D_5$ and $D_6$) are calculated here solely based on the polysiloxane proportion.

Further conversions were conducted analogously according to the data from table 2:

TABLE 2

|  | 2C | 2B | 2B* | 2A |
|---|---|---|---|---|
| Acetylated PDMS from example 1C (polysilanol C (Mn = 1371 g/mol)) | 300.0 | | | |
| Acetylated PDMS from example 1B (polysilanol B (Mn = 5490 g/mol)) | | 300.0 | 300.0 | |
| Acetylated PDMS from example 1A* (polysilanol A (Mn = 2742 g/mol)) | | | | 300.0 |
| Acetic anhydride | 20.8 | 5.5 | 11.0 | 10.8 |
| Trifluoromethanesulfonic acid | 0.32 | 0.31 | 0.31 | 0.31 |
| Sodium carbonate | 9.62 | 9.16 | 9.33 | 9.32 |
| Mn (g/mol) of the linear acetoxy group-bearing polysiloxane with defined organosiloxane units/reduced molecular weight | 737 | 2844 | 1930 | 1472 |

Step 2, Modified: Preparation of a Branched Acetoxy Group-Bearing Polysiloxane with Desired Organosiloxane Units/Reduced Molecular Weight Example 2D mod.: In a 500 ml four-neck round-bottom flask equipped with a precision glass stirrer, an internal thermometer, and a reflux condenser on top, 300.0 g of the linear acetoxypolysiloxane prepared in example 1D together with 15.3 g of methyltriethoxysilane (0.09 mol) and 52.5 g of acetic anhydride (0.17 mol) were initially charged at 23° C. while stirring. The mixture was subsequently heated to 150° C., with 0.37 g of trifluoromethanesulfonic acid additionally being added thereto during the heating. A total reaction time of 6 hours was held and allowed the reaction mixture to cool down to 80° C. 11.04 g of sodium carbonate were added to the reaction mixture at this temperature, the mixture was stirred for 6 hours and then subjected to extractive distillation at 80° C. under 20 mbar vacuum for 2 hours. The salts were separated off using a fluted filter. Cooling of the reaction mixture afforded a clear colourless acetylated branched polysiloxane.

The target structure of the clearly branched polysiloxane bearing acetoxy functions is confirmed by the accompanying $^{29}$Si NMR spectroscopy. The $^{29}$Si NMR spectroscopy likewise assures that no contents whatsoever of SiOH groups are present, within the scope of measurement accuracy.

Conversion of the Branched Acetoxypolysiloxane Into the Corresponding Branched Isopropoxypolysiloxane for Analytical Characterization Immediately after the synthesis, in a 250 ml four-neck round-bottom flask equipped with a precision glass stirrer, an internal thermometer, and a reflux condenser on top, 100.0 g of this trifluoromethanesulfonic acid-acidified, equilibrated branched acetoxypolysiloxane were mixed together with 23.2 g of a molecular sieve-dried isopropanol at 22° C. with stirring. Gaseous ammonia (NH$_3$) was then introduced to the reaction mixture until alkaline reaction (moist universal indicator paper) and the mixture was then stirred at this temperature for a further 45 minutes. The precipitated salts were separated off using a fluted filter.

A colourless, clear liquid was isolated, the accompanying $^{29}$Si NMR spectrum of which confirms the quantitative conversion of the branched acetoxypolysiloxane into a branched isopropoxypolysiloxane.

An aliquot of this branched isopropoxypolysiloxane is withdrawn and analysed by gas chromatography. The gas chromatogram shows the following contents (reported in percent by mass):

| D$_4$ | D$_5$ | D$_6$ | Sum total (D$_4$-D$_6$) | Isopropanol content |
|---|---|---|---|---|
| 0.23% | 0.35% | 0.40% | 0.98% | 12.30% |

Taking the isopropanol excess into account, the contents of siloxane cycles (D$_4$, D$_5$ and D$_6$) are calculated here solely based on the polysiloxane proportion.

Further conversions were conducted analogously according to the data from table 3:

TABLE 3

| | 2D mod | 2D mod * | 2D mod ** | 2D mod *** |
|---|---|---|---|---|
| Acetylated PDMS from example 1D (polysilanol D (Mn = 3398 g/mol)) | 300.0 g | 300.0 g | 300.0 g | 300.0 g |
| MTEOS | 15.3 g | 30.5 g | 45.8 g | |
| TEOS | | | | 53.5 g |
| Acetic anhydride | 52.2 g | 52.5 | 78.8 | 84.8 |
| Trifluoromethanesulfonic acid | 0.37 g | 0.38 | 0.42 | 0.43 |
| Sodium carbonate | 11.04 g | 11.5 | 12.8 | 13.0 |

Step 3: Replacement of the Siloxane-Bonded Acetoxy Groups Via the Reaction with Polyetherols In a 500 ml four-neck flask equipped with a precision glass stirrer, an internal thermometer, and a reflux condenser on top, 67.1 g of a butanol-started polyetherol (propylene oxide proportion of 100%) having a molar mass of 1935 g/mol (molar mass determined according to OH number) in 200 ml of toluene were initially charged with stirring and admixed with 20 g of the acetoxy group-bearing polysiloxane prepared from example 2A.

The reaction mixture was heated to 50° C. for 30 minutes with continued stirring. Then, over the course of a further 30 minutes, firstly the amount of gaseous ammonia required for neutralization was introduced into the reaction matrix. Over the course of a further 45 minutes, an additional gentle ammonia stream was introduced so that the reaction mixture clearly showed alkaline reaction (moist indicator paper).

The precipitated salts were removed from the toluenic phase via a double-fluted filter.

The crude product was freed of toluene by distillation on a rotary evaporator with a bottom temperature of 70° C. and an applied auxiliary vacuum of 1 mbar.

The virtually colourless preparation of an SiOC-linked linear/branched polyethersiloxane, the target structure of which is confirmed by a $^{29}$Si-NMR spectrum, was isolated.

The invention claimed is:

1. A process for preparing a SiOC-based polyethersiloxane based on a linear α,ω-hydroxy group-bearing siloxane, the process comprising:
   in a first step, preparing an α,ω-acetoxy group-bearing linear polysiloxane from the linear α,ω-hydroxy group-bearing siloxane,
   in a second step, converting the α,ω-acetoxy group-bearing linear polysiloxane with a desired number of organosiloxane units, wherein the converted α,ω-acetoxy group-bearing linear polysiloxane have α,ω-acetoxy groups, and
   in a third step, reacting the converted α,ω-acetoxy group-bearing linear polysiloxane from the second step with a polyetherol and optionally monool to give a SiOC-based polyethersiloxane.

2. The process according to claim 1, comprising
   in the first step, reacting the linear α,ω-hydroxy group-bearing polysiloxane with acetic anhydride to give an acetoxy group-bearing linear polysiloxane, and
   in the second step, equilibrating the acetoxy group-bearing linear polysiloxane from the first step with a mixture, comprising acetic anhydride and an acid, in order to obtain the α,ω-acetoxy group-bearing linear polysiloxane with the desired number of organosiloxane units.

3. The process according to claim 2, wherein the linear α,ω-hydroxy group-bearing siloxane satisfies at least formula (I):

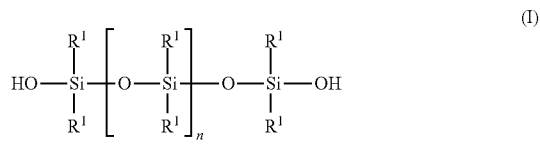

wherein R$^1$ is an alkyl radical and/or aromatic radical, comprising 1 to 10 carbon atoms, and
wherein 1≤n≤19,000.

4. The process according to claim 2, wherein the acid is a superacid having a pKa of less than −3.0.

5. The process according to claim 2, wherein in the third step, the converted α,ω-acetoxy group-bearing polysiloxane from the second step is reacted with the polyetherol and optionally the monool.

6. The process according to claim 5, wherein the monool employed is selected from the group consisting of ethanol, propanol, isopropanol, butanol, isobutanol, and a polyetherol of formula

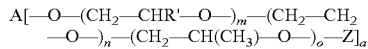

wherein
A is a saturated or unsaturated organic radical comprising at least one carbon atom
R' is independently a saturated alkyl group comprising 2-18 carbon atoms or an aromatic radical,
Z is hydrogen,
m equals from 0 to 50,
n equals from 0 to 250,
equals from 0 to 250, and
a equals 1.

7. The process according to claim 2, wherein in the third step a replacement of siloxane-bonded acetoxy groups occurs in the presence of a base.

8. The process according to claim 2, wherein in the third step a replacement of siloxane-bonded acetoxy groups via reaction with the polyetherol is effected using an inert solvent, and optionally already present, acetic acid.

9. The process according to claim 2, wherein in the third step a replacement of the siloxane-bonded acetoxy groups via the reaction with the polyetherol occurs without solvent.

10. The process according to claim 1, wherein the α,ω-acetoxy group-bearing linear polysiloxane converted in the second step has 5-50 organosiloxane units.

11. The process according to claim 1, wherein in the second step, a silane bearing alkoxy groups is additionally added in order to obtain a branched α,ω-acetoxy group-bearing polysiloxane.

12. The process according to claim 11, wherein at least 1 mole of polyether-bonded OH functionality is used per mole of acetoxy group of the branched α,ω-acetoxy group-bearing polysiloxane.

13. The process according to claim 1, wherein acetic acid is added in the second step.

14. The process according to claim 1, wherein the polyetherol is of formula (II):

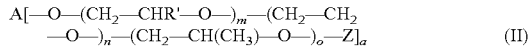

wherein
A is either hydrogen or a saturated or unsaturated organic radical comprising at least one carbon atom,
R' is independently a saturated alkyl group comprising 2-18 carbon atoms or an aromatic radical,
Z is hydrogen,
m equals from 0 to 50,
n equals from 0 to 250,
equals from 0 to 250,
a equals from 1 to 8, and
with the proviso that a sum of m, n, and o is equal to or greater than 1 and with the proviso that at least one of A or Z represents hydrogen.

15. The process according to claim 1,
wherein the second step comprises transesterification of the α,ω-acetoxy group-bearing linear polysiloxane,
wherein the transesterification is conducted in a solvent which is inert under reaction conditions,
wherein a total water content of the solvent is ≤50 ppm by mass, and
wherein determination of the total water content is performed by Karl Fischer titration.

16. The process according to claim 15, wherein the transesterification is conducted in a temperature range from 40° C. to 180° C.

17. The process according to claim 15, wherein the transesterification is conducted at reduced pressure and/or while passing through an inert gas.

18. A preparation produced by the process of claim 1, comprising:
at least one SiOC-linked, branched silicone polyether,
the polyetherol, and
a polyether endcapped with an acetyl group,
with the proviso that a polyether radical present in the at least one SiOC-linked, branched silicone polyether is chemically identical to a polyether radical of the polyetherol and to a polyether radical of the polyether endcapped with an acetyl group, and
wherein a proportion of the SiOC-linked, branched silicone polyether is at least 50 percent by mass based on the preparation.

19. A method, comprising:
producing at least one product selected from the group consisting of defoamers, deaerating agents, foam stabilizers, wetting agents, paint and levelling additives, and demulsifiers, with the preparation according to claim 18.

20. A method, comprising:
producing at least one product selected from the group consisting of diesel defoamers, hydrophobizing agents, polymer dispersions, adhesives, sealants, paper towels, cleaning and care formulations for household or for industrial applications, cosmetic, pharmaceutical, or dermatological compositions, construction material compositions, and thermoplastic shaped bodies, with the preparation according to claim 18.

21. The preparation according to claim 18, wherein the preparation is selected from the group consisting of:
a processing aid in an extrusion of thermoplastics,
an adjuvant in crop protection,
an additive for cleaning and caring of hard surfaces,
a surface treatment of fibres, particles, or fabrics, and
a coating of fillers.

* * * * *